US008861391B1

(12) United States Patent
Zhang et al.

(10) Patent No.: US 8,861,391 B1
(45) Date of Patent: Oct. 14, 2014

(54) CHANNEL FEEDBACK FOR TDM SCHEDULING IN HETEROGENEOUS NETWORKS HAVING MULTIPLE CELL CLASSES

(75) Inventors: Yan Zhang, Palo Alto, CA (US); Krishna Srikanth Gomadam, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 75 days.

(21) Appl. No.: 13/409,130

(22) Filed: Mar. 1, 2012

Related U.S. Application Data

(60) Provisional application No. 61/448,497, filed on Mar. 2, 2011.

(51) Int. Cl.
*H04L 1/00* (2006.01)
*H04B 7/06* (2006.01)

(52) U.S. Cl.
CPC ........ *H04L 1/0007* (2013.01); *H01L 25/03949* (2013.01); *H04B 7/0619* (2013.01)
USPC ............................ 370/252; 370/312; 375/299

(58) Field of Classification Search
CPC ............ H04L 1/0007; H04L 25/03949; H04B 7/0619
USPC ........... 370/252; 375/219, 260, 267, 316, 299
See application file for complete search history.

(56) References Cited

U.S. PATENT DOCUMENTS 5,231,629 A 7/1993 Kotzin et al.
5,349,567 A 9/1994 Reed
5,940,439 A 8/1999 Kleider et al.
6,466,904 B1 10/2002 Gao et al.
6,512,750 B1 1/2003 Palenius
6,757,319 B1 6/2004 Parsa et al.
6,865,237 B1 3/2005 Boariu et al.

(Continued)

FOREIGN PATENT DOCUMENTS

EP 2182754 A1 5/2010
JP 2008236222 A 2/2008

(Continued)

OTHER PUBLICATIONS

Japanese Patent Application # 2011-544111 Office Action dated Mar. 12, 2013.

(Continued)

*Primary Examiner* — Dang Ton
*Assistant Examiner* — Mewale Ambaye

(57) ABSTRACT

A method includes receiving in a communication terminal a sequence of downlink frames from a communication network that includes multiple cells arranged in first and second layers. The first layer corresponds to a first class of cells selected from a group of classes consisting of macro-cells, micro-cells, pico-cells, femto-cells and low-power nodes (LPN). The second layer corresponds to a second class of cells, different from the first class. One or more cross-layer frames in which at least a first cell in the first layer and at least a second cell in the second layer transmit data, and one or more same-layer frames in which only one or more of the cells in a single layer that currently serves the terminal transmit the data, are identified in the sequence. Cross-layer channel feedback is calculated over the cross-layer frames, and same-layer channel feedback is calculated over the same-layer frames.

26 Claims, 2 Drawing Sheets

(56) References Cited

U.S. PATENT DOCUMENTS 7,839,944 B2 11/2010 Lee et al.
7,941,186 B2 5/2011 Cho et al.
8,036,286 B2 10/2011 Lee et al.
8,068,555 B2 11/2011 Jongren et al.
8,098,750 B2 1/2012 Mueck et al.
8,179,775 B2 5/2012 Chen et al.
8,325,844 B2 12/2012 Walton et al.
2003/0035491 A1 2/2003 Walton et al.
2005/0141630 A1 6/2005 Catreux et al.
2005/0157810 A1 7/2005 Raleigh et al.
2005/0237920 A1 10/2005 Howard et al.
2005/0250544 A1 11/2005 Grant et al.
2006/0014554 A1 1/2006 Gerlach
2006/0056538 A1 3/2006 Nam et al.
2006/0093060 A1 5/2006 Jung et al.
2006/0114858 A1 6/2006 Walton et al.
2006/0153112 A1 7/2006 Lim et al.
2006/0203777 A1 9/2006 Kim et al.
2006/0233131 A1 10/2006 Gore et al.
2006/0276212 A1 12/2006 Sampath et al.
2007/0058746 A1 3/2007 Gueguen
2007/0076810 A1 4/2007 Herrera et al.
2007/0099578 A1 5/2007 Adeney et al.
2007/0149229 A1 6/2007 Frederiksen et al.
2007/0153731 A1* 7/2007 Fine ............................ 370/329
2007/0160162 A1 7/2007 Kim et al.
2007/0165738 A1 7/2007 Barriac et al.
2007/0217540 A1 9/2007 Onggosanusi et al.
2007/0223422 A1 9/2007 Kim et al.
2007/0223423 A1 9/2007 Kim et al.
2007/0230373 A1 10/2007 Li et al.
2007/0248068 A1 10/2007 Onggosanusi et al.
2007/0253386 A1 11/2007 Li et al.
2007/0270170 A1 11/2007 Yoon et al.
2008/0013610 A1 1/2008 Varadarajan et al.
2008/0025336 A1 1/2008 Cho et al.
2008/0039067 A1 2/2008 Jin et al.
2008/0043702 A1 2/2008 Moon et al.
2008/0080364 A1 4/2008 Barak et al.
2008/0080632 A1 4/2008 Kim et al.
2008/0080634 A1 4/2008 Kotecha et al.
2008/0080635 A1 4/2008 Hugl et al.
2008/0080637 A1 4/2008 Khan et al.
2008/0095258 A1 4/2008 She et al.
2008/0101407 A1 5/2008 Khan et al.
2008/0108310 A1 5/2008 Tong et al.
2008/0112351 A1 5/2008 Surineni et al.
2008/0130778 A1 6/2008 Xia et al.
2008/0144522 A1 6/2008 Chang et al.
2008/0165875 A1 7/2008 Mundarath et al.
2008/0186212 A1 8/2008 Clerckx et al.
2008/0192852 A1* 8/2008 Kent et al. .................... 375/262
2008/0198776 A1 8/2008 Seo
2008/0232494 A1 9/2008 Pan et al.
2008/0232503 A1 9/2008 Kim
2008/0247364 A1 10/2008 Kim et al.
2008/0247475 A1 10/2008 Kim et al.
2008/0268855 A1 10/2008 Hanuni et al.
2008/0268887 A1 10/2008 Jansen et al.
2008/0285433 A1 11/2008 Akita et al.
2008/0292013 A1 11/2008 Varadarajan et al.
2008/0298452 A1 12/2008 Sampath et al.
2008/0298482 A1 12/2008 Rensburg et al.
2008/0318606 A1 12/2008 Tsutsui et al.
2009/0011761 A1 1/2009 Han et al.
2009/0016263 A1 1/2009 Kishigami et al.
2009/0046800 A1 2/2009 Xu et al.
2009/0098876 A1 4/2009 Khan et al.
2009/0110114 A1 4/2009 Onggosanusi et al.
2009/0122857 A1 5/2009 Li et al.
2009/0161605 A1* 6/2009 Shen et al. .................... 370/328
2009/0180561 A1* 7/2009 Kim et al. .................... 375/260
2009/0252332 A1 10/2009 Chang et al.
2009/0252333 A1 10/2009 Chang et al.
2009/0282310 A1 11/2009 Seok et al.
2009/0296844 A1 12/2009 Ihm et al.
2009/0304109 A1 12/2009 Kotecha
2010/0031117 A1 2/2010 Lee et al.
2010/0034308 A1 2/2010 Kim et al.
2010/0035627 A1 2/2010 Hou et al.
2010/0054354 A1 3/2010 Tosato
2010/0056170 A1 3/2010 Lindoff et al.
2010/0061477 A1 3/2010 Lee et al.
2010/0067512 A1 3/2010 Nam et al.
2010/0069106 A1 3/2010 Swarts et al.
2010/0074301 A1 3/2010 Howard et al.
2010/0103834 A1 4/2010 Gorokhov et al.
2010/0158151 A1 6/2010 Krauss et al.
2010/0172424 A1 7/2010 Perets et al.
2010/0172430 A1 7/2010 Melzer et al.
2010/0173639 A1 7/2010 Li et al.
2010/0215112 A1 8/2010 Tsai et al.
2010/0220800 A1 9/2010 Erell et al.
2010/0238984 A1 9/2010 Sayana et al.
2010/0254474 A1 10/2010 Gomadam et al.
2010/0260234 A1 10/2010 Thomas et al.
2010/0260243 A1 10/2010 Ihm et al.
2010/0267341 A1 10/2010 Bergel et al.
2010/0271968 A1 10/2010 Liu et al.
2010/0272014 A1 10/2010 Orlik et al.
2010/0272032 A1 10/2010 Sayana et al.
2010/0273514 A1 10/2010 Koo et al.
2010/0278278 A1 11/2010 Lee et al.
2010/0284484 A1 11/2010 Jongren et al.
2010/0290548 A1 11/2010 Hoshino et al.
2010/0296603 A1 11/2010 Lee et al.
2011/0019631 A1 1/2011 Kotecha et al.
2011/0026413 A1 2/2011 Swarts et al.
2011/0034175 A1 2/2011 Fong et al.
2011/0058621 A1 3/2011 Clerckx et al.
2011/0064156 A1 3/2011 Kim et al.
2011/0077038 A1 3/2011 Montojo et al.
2011/0080969 A1 4/2011 Jongren et al.
2011/0085610 A1 4/2011 Zhuang et al.
2011/0096704 A1 4/2011 Erell et al.
2011/0103534 A1 5/2011 Axmon et al.
2011/0110403 A1 5/2011 Jongren
2011/0110450 A1* 5/2011 Gomadam et al. ............ 375/267
2011/0150052 A1 6/2011 Erell et al.
2011/0164701 A1 7/2011 Nikopourdeilami et al.
2011/0170435 A1 7/2011 Kim et al.
2011/0170638 A1 7/2011 Yuan et al.
2011/0188393 A1 8/2011 Mallik et al.
2011/0194594 A1 8/2011 Noh et al.
2011/0194638 A1 8/2011 Erell et al.
2011/0194644 A1 8/2011 Liu et al.
2011/0205930 A1 8/2011 Rahman et al.
2011/0216846 A1 9/2011 Lee et al.
2011/0235608 A1 9/2011 Koo et al.
2011/0250919 A1 10/2011 Barbieri et al.
2011/0268204 A1 11/2011 Choi et al.
2011/0274188 A1 11/2011 Sayana et al.
2011/0306341 A1 12/2011 Klein et al.
2012/0002568 A1 1/2012 Tiirola et al.
2012/0020433 A1 1/2012 Bhattad et al.
2012/0033592 A1 2/2012 Kim et al.
2012/0058735 A1 3/2012 Vermani et al.
2012/0063336 A1 3/2012 Shany et al.
2012/0069887 A1 3/2012 Park et al.
2012/0069917 A1 3/2012 Liu et al.
2012/0087425 A1 4/2012 Gomadam et al.
2012/0087435 A1 4/2012 Gomadam et al.
2012/0134434 A1 5/2012 Chen et al.
2012/0219042 A1 8/2012 Onggosanusi et al.
2012/0219083 A1 8/2012 Tong et al.
2012/0257664 A1 10/2012 Yue et al.
2012/0275376 A1 11/2012 Sampath et al.
2012/0275386 A1 11/2012 Frenne et al.
2012/0281620 A1 11/2012 Sampath et al.
2013/0028068 A1 1/2013 Park et al.
2013/0028344 A1 1/2013 Chen et al.
2013/0039284 A1 2/2013 Marinier et al.
2013/0051256 A1 2/2013 Ong et al.

(56) References Cited

U.S. PATENT DOCUMENTS

2013/0107916 A1 5/2013 Liu et al.
2013/0176991 A1 7/2013 Yi
2013/0182786 A1 7/2013 Frenne et al.

FOREIGN PATENT DOCUMENTS

JP 2008054125 A 3/2008
JP 2008118411 A 5/2008
JP 2008147792 A 6/2008
WO 2005117283 A2 12/2005
WO 2007133564 A3 11/2007
WO 2008009157 A1 1/2008
WO 2008133582 A2 11/2008
WO 2010013950 A2 2/2010
WO 2011147692 A1 12/2011

OTHER PUBLICATIONS

U.S. Appl. No. 13/252,218 Office Action dated Apr. 11, 2013.
ZTE, "Link Analysis of 4Tx Codebook Design for DL SU-MIMO", 3GPP TSG-RAN WG1 #48bis, St. Julians, Malta, Mar. 26-30, 2007.
Asahi, H., "A Function Generator for Walsh Order Hadamard Matrix and Fast Walsh-Hadamard Transform", Geoinformatics, vol. 11, No. 1, pp. 3-9, year 2000.
U.S. Appl. No. 12/253,078 Office Action dated May 23, 2013.
U.S. Appl. No. 12/477,152 Official Action dated Jun. 26, 2012.
U.S. Appl. No. 12/723,645 Official Action dated Aug. 31, 2012.
U.S. Appl. No. 12/723,647 Official Action dated Aug. 17, 2012.
U.S. Appl. No. 12/652,044 Official Action dated Jun. 29, 2012.
U.S. Appl. No. 12/838,509 Official Action dated Jun. 21, 2012.
U.S. Appl. No. 13/023,555 Official Action dated Sep. 14, 2012.
International Application PCT/IB2012/051511 Search Report dated Aug. 31, 2012.
U.S. Appl. No. 13/610,904, filed Sep. 12, 2012.
3GPP TR 36.819 "3rd Generation Partnership Project; Technical Specification Group Radio Access Network; Coordinated Multi-Point Operation for LTE Physical Layer Aspects (release 11)", version 11.0.0, Sep. 2011.
U.S. Appl. No. 61/558,405, filed Nov. 10, 2011.
U.S. Appl. No. 61/556,752, filed Nov. 7, 2011.
U.S. Appl. No. 61/585,556, filed Jan. 11, 2012.
3rd Generation Partnership Project; Technical Specification Group Radio Access Network; Requirements for Further Advancements for Evolved Universal Terrestrial Radio Access (E-UTRA) (LTE-Advanced) (Release 8), 3GPP TR 36.913 V8.0.1, Sophia Antipolis, France, Mar. 2009.
Motorola, "Uplink Power Control for E-UTRA", 3GPP TSG RAN1 #48, St. Louis, USA, Feb. 12-16, 2007.
Nortel, "On the discussions of carrier aggregations", 3GPP TSG-RAN Working Group 1 Meeting #55, Prague, Czech Republic, Nov. 10-14, 2008.
NTT Docomo, Inc., "Updated Views on Support of Wider Bandwidth in LTE-Advanced", 3GPP TSG RAN WG1 Meeting #54bis, Prague, Czech Republic, Sep. 29-Oct. 3, 2008.
3rd Generation Partnership Project; Technical Specification Group Radio Access Network; User Equipment (UE) radio transmission and reception (FDD) (Release 8), 3GPP TS 25.101 V8.5.1, Sophia Antipolis, France, Jan. 2009.
Lucent Technologies, "Link Error Prediction for E-DCH", TSG-RAN WG1#35, Lisbon, Portugal, Nov. 17-21, 2003.
Ericsson, "On Channel Reciprocity for Enhanced DL Multi-Antenna Transmission", TSG-RAN WG1 #59, Jeju, Korea, Nov. 9-13, 2009.
Ericsson, "System-level evaluation of OFDM—further considerations", TSG-RAN WG1 #35, Lisbon, Portugal, Nov. 17-21, 2003.
Nortel Networks, "OFDM Exponential Effective SIR Mapping Validation, EESM Simulation Results for System-Level Performance Evaluations, and Text Proposal for Section A.4.5 of TR 25.892", 3GPP TSG-RAN-1/TSG-RAN-4 Ad Hoc, Espoo, Finland, Jan. 27-30, 2004.
Park et al., "Efficient Coherent Neighbour Cell Search for Synchronous 3GPP LTE System", Electronic Letters, vol. 44, No. 21, Oct. 2008.
Motorola, "Low-Overhead Feedback of Spatial Covariance Matrix", TSG-RAN WG1 #59, Jeju, Korea, Nov. 9-13, 2009.
Motorola, "Use of UL Covariance for Downlink MIMO in FDD", TSG-RAN WG1 #59, Jeju, Korea, Nov. 9-13, 2009.
3rd Generation Partnership Project, "Technical Specification Group Radio Access Network; Evolved Universal Terrestrial Radio Access (E-UTRA); Multiplexing and channel coding (Release 8)", 3GPP TS 36.212 V8.6.0 (Mar. 2009), Sophia Antipolis, France.
Samsung, "Discussion on Enhanced DL Beamforming", 3GPP TSG RAN WG1 Meeting #56bis, Seoul, Korea, Mar. 23-27, 2009.
Alcatel-Lucent Shanghai Bell, "Correlation-based Explicit Feedback", 3GPP TSG RAN WG1 Meeting # 59bis, Valencia, Spain, Jan. 18-22, 2010.
International Application PCT/IB2010/051088 Search Report dated Sep. 21, 2010.
International Application PCT/IB2010/053272 Search report dated Dec. 27, 2010.
Motorola, "Codebook for 8Tx DL SU-MIMO for LTE-1", TSG-RAN WG1 #59, Jeju, Korea, Nov. 9-13, 2009.
Marvell Semiconductor, "Precoding Options for 8Tx Antennas in LTE-A DL", 3GPP TSG RAN WG1 Meeting #55bis, Ljubljana, Slovenia, Jan. 12-16, 2009.
U.S. Appl. No. 13/052,075, filed Mar. 20, 2011.
Marvell, "Codebook Adaptation for ULA Antenna", 3GPP TSG RAN WG1 Meeting #60, San Francisco, USA, Feb. 22-22, 2010.
U.S. Appl. No. 61/321,386, filed Apr. 6, 2010.
U.S. Appl. No. 611294,737, filed Mar. 13, 2010.
U.S. Appl. No. 12/902,168, filed Oct. 12, 2010.
U.S. Appl. No. 12/903,237, filed Oct. 13, 2010.
Alcatel-Lucent, "Fractional Power Control Using Pilot Power Ration Measurements for the E-UTRA Uplink", 3GPP TSG RAN WG1 # 48, St. Louis, USA, Feb. 12-16, 2007.
Alcatel-Lucent Shanghai Bell, "Considerations on spatial covariance aided implicit feedback for MU-MIMO", 3GPP TSG RAN WG1 Meeting #59, Jeju, Korea, Nov. 9-13, 2009.
Catt, "Feedback enhancements for LTE—A downlink transmission", 3GPP TSG RAN WG1 Meeting #59, Jeju, Korea, Nov. 9-13, 2009.
Marvell, "Details of PUCCH 1-1 for 8Tx", 3GPP TSG RAN # 63, Jacksonville, USA, Nov. 15-19, 2010.
U.S. Appl. No. 13/346,737, filed Jan. 10, 2012.
Ericsson et al., "Way Forward for Rel-10 Feedback Framework", 3GPP TSG RAN WG1 Meeting #60, San Francisco, USA, Feb. 22-22, 2010.
Huawei, "Adaptive Feedback: A New Perspective of the Adaptive Codebook", 3GPP TSA RAN WG1 meeting #58, Shenzhen, China, Aug. 24-28, 2009.
Motorola, "Interference Mitigation via Power Control and FSM Resource Allocation and UE Alignment for E-UTRA Uplink and TP", 3GPPP TSG RAN1 # 44, Denver, USA, Feb. 13-17, 2006.
Marvell, "Successive Codebook Refinement: Further details and evaluation", 3GPP TSG-RAN WG1 #60bis, Beijing, Apr. 12-16, 2010.
Marvell Semiconductor, "Feedback Methods for Exploiting Channel Correlation in LTE-A DL", 3GPP TSG RAN WG1 Meeting #57, Los Angeles, USA, Jun. 29-Jul. 3, 2009 (R1-092395).
Marvell Semiconductor, "Spatial Correlation based transmission schemes for LTE-A DL", 3GPP TSG RAN WG1 meeting #58, Shenzhen, China, Aug. 24-28, 2009.
Samsung, "Comparisons and performance evaluation of differential feedback proposals for Rel 8 PMI enhancements", 3GPP TSG RAN WG1 Meeting #59bis, Valencia, Spain, Jan. 18-22, 2010.
Samsung, "Codebook Design for 8 Tx Transmission in LTE-A", 3GPP TSG RAN WG1 Meeting #56, Athens, Greece, Feb. 9-13, 2009.
International Application PCT/IB2009/052987 Search Report dated Jan. 27, 2010.
Rapporteur (NTT DOCOMO), "Text Proposal for RAN1 TR on LTE Advanced", 3GPP TSG RAN WG1 Meeting #53bis, Warsaw, Poland, Jun. 30-Jul. 4, 2008.

(56) References Cited

OTHER PUBLICATIONS

Ericsson, "Design and Evaluation of Precoder Codebooks for CSI Feedback", 3GPP TSG RAN WG1 61bis, Dresden, Germany, Jun. 28-Jul. 2, 2010.
Samsung, "Coordinated Multi-Point Operation for LTE", TSG RAN WG1 50, Istanbul, Turkey, Dec. 7-10, 2010.
Alcatel-Lucent et al., "Way Forward on CSI Feedback for Rel.10 DL MIMO", 3GPP TSG RAN WG1 62, Madrid, Spain, Aug. 23-27, 2010.
Alcatel-Lucent et al., "Further Analysis of Companion Feedback Performance and Feedback Signaling Overhead Reduction", 3GPP TSG RAN WG1 62, Madrid, Spain, Aug. 23-27, 2010.
Alcatel-Lucent et al., "Way Forward on CQI/PMI Reporting Enhancement on PUSCH 3-1 for 2, 4 and 8 TX", 3GPP TSG RAN WG1 62bis, Xian, China, Oct. 11-15, 2010.
Marvell, "CQI Enhancement for 4Tx", 3GPP TSG-RAN WG1 #62bis, Xian, Oct. 11-15, 2010.
NEC Group, "Enhancing MU-MIMO CQI," 3GPP TSG-RAN WGI #62bis, Xian, China, Oct. 11-15, 2010.
LG Electronics, "Further Discussion on CQI/PMI Enhancement", 3GPP TSG RAN # 62BIS, Xian, China, Oct. 11-15, 2010.
Marvell, "Two-Component PMI Codebook for 8TX", 3GPP TSG RAN # 62 Meeting, Madrid, Spain, Aug. 23-27, 2010.
U.S. Appl. No. 13/433,293, filed Mar. 29, 2012.
Alcatel-Lucent et al., "Way Forward on Enhancement for Rel.10 DL MIMO", 3GPP TSG RAN WG1 62, Madrid, Spain, Aug. 23-27, 2010.
Samsung, "Preliminary CoMP JP Results for Homogeneous Networks", 3GPP TSG RAN # 64, Taipei, Taiwan, Feb. 21-25, 2011.
Huawei, "Performance Evaluation of Phase 1: Downlink Homogeneous Network with High Tx Power RRHs", 3GPP TSG RAN # 64, Taipei, Taiwan, Feb. 21-25, 2011.
ZTE, "Initial CoMP Evaluation for Homogeneous Network with High Tx Power RRHs", 3GPP TSG RAN # 64, Taipei, Taiwan, Feb. 21-25, 2011.
U.S. Appl. No. 12/723,647 Official Action dated Feb. 6, 2012.
U.S. Appl. No. 12/723,647 Official Action dated Apr. 27, 2012.
U.S. Appl. No. 12/652,044 Official Action dated Feb. 7, 2012.
Alcatel-Lucent et al., "Way Forward on 8Tx Codebook for Rel.10 DL MIMO", 3GPP TSG RAN WG1 62, Madrid, Spain, Aug. 23-27, 2010.
U.S. Appl. No. 61/568,588, filed Dec. 8, 2011.
Ericsson, "On Data Channel Performance with Cell Range Expansion and Non-Full Buffer Traffic", 3GPP TSG RAN WG1 Meeting # 62Bis, Xian, China, Oct. 11-15, 2010.
Qualcomm Incorporated, "Improving Control Reliability in Severe Interference Conditions", 3GPP TSG RAN WG1 #61bis, Dresden, Germany, Jun. 28-Jul. 2, 2010.
Qualcomm Incorporated, "Analysis of Solutions to Improve Control Reliability in Severe Interference Conditions", 3GPP TSG RAN WG1 #62, Madrid, Spain, Aug. 23-27, 2010.
Huang et al., "A Limited Feedback Precoding System with Hierarchical Codebook and Linear Receiver", IEEE Transactions on Wireless Communications, vol. 7, No. 12, pp. 4843-4848, Dec. 2008.
Kim et al., "Efficient Feedback via Subs pace-Based Channel Quantization for Distributed Cooperative Antenna Systems with Temporarily Correlated Channels", EURASIP Journal on Advances in Signal Processing, vol. 2008, Nov. 23, 2007.
NTT Docomo, "Views on Codebook Design for Downlink 8Tx MIMO", 3GPP TSG RAN WG1 Meeting #59bis, Valencia, Spain, Jan. 18-22, 2010.
Alcatel Lucent, "Overview of Hierarchical Codebook Approach", 3GPP TSG RAN WG1 Meeting #59bis, Valencia, Spain, Jan. 18-22, 2009.
JP Patent Application # 2011-024295 Official Action dated Sep. 11, 2012.
Samsung, "Precoding for polarized 4Tx configurations", 3GPP TSG RAN WG1 Meeting #48bis, St Julian's, Malta, Mar. 26-30, 2007.
Mondal et al., "Rank-Independent Codebook Design from a Quaternary Alphabet", Proceedings of 41st Asilomar Conference on Signals, Systems and Computers (ACSSC), pp. 297-301, Nov. 7, 2007.
JP Patent Application # 2011-544111 Official Action dated Nov. 6, 2012.
International Application No. PCT/IB2009/052726 Search Report dated Jan. 28, 2010.
International Application No. PCT/IB2010/050014 Search Report dated Jun. 15, 2010.
International Application No. PCT/IB2010/050797 Search Report dated Jul. 15, 2010.
International Application No. PCT/IB2010/051089 Search Report dated Jul. 9, 2010.
Ericsson, "Carrier Aggregation in LTE-Advanced", TSG-RAN WG1 #53bis, Warsaw, Poland, Jun. 30-Jul. 4, 2008.
Viswanath et al., "Opportunistic Beamforming Using Dumb Antennas," IEEE Transactions on Information Theory, vol. 48, No. 6, pp. 1277-1294, Jun. 2002.
Sharif et al., "On the Capacity of MIMO Broadcast Channels with Partial Side Information," IEEE Transactions on Information Theory, vol. 51, No. 2, pp. 506-522, Feb. 2005.
Texas Instruments, "Codebook Design for E-UTRA MIMO Precoding", 3GPP TSG RAN WG1 46bis, Seoul, Korea, Oct. 9-13, 2006.
Samsung, "Codebook based Precoding for 8 Tx Transmission in LTE-A", 3GPP TSG RAN WG1 Meeting #55, Prague, Czech Republic, Nov. 10-14, 2008.
Qualcomm Europe, "Link Analysis for 4×2 and 4×4 Precoder Set Decision", 3GPP TSG-RAN WG1 #48bis, St. Julian's, Malta, Mar. 26-30, 2007.
3GPP TR 25.892 V6.0.0, "3rd Generation Partnership Project; Technical Specification Group Radio Access Network; Feasibility Study for Orthogonal Frequency Division Multiplexing (OFDM) for UTRAN enhancement (Release 6)", Sophia Antipolis, France, Jun. 2004.
Samsung, "CQI reporting for MU-MIMO", 3GPP TSG RAN WG1 Meeting #54, Jeju, Korea, Aug. 18-22, 2008.
Motorola, "Some Results on DL-MIMO Enhancements for LTE-A", TSG-RAN WG1 #55bis, Ljubljana, Slovenia, Jan. 12-16, 2009.
Alcatel-Lucent, ""Best Companion" reporting for improved single-cell MU-MIMO pairing", 3GPP TSG RAN WG1 #56 Meeting, Athens, Greece, Feb. 9-13, 2009.
Nokia Siemens Networks, "LTE-Advanced SU-MIMO UE Transmission in LTE Release 8 Network", 3GPP TSG RAN WG1 Meeting #57, San Francisco, USA, May 4-8, 2009 (R1-091773).
3GPP TS 25.214 V8.5.0, "3rd Generation Partnership Project; Technical Specification Group Radio Access Network"; Physical Layer Procedures (FDD) (Release 8), Sophia Antipolis, France, Mar. 2009.
IEEE Standard 802.16 for Local and metropolitan area networks, "Part 16: Air Interface for Fixed Broadband Wireless Access Systems", Revision of IEEE Standard 802.16—2001, IEEE Computer Society and IEE Microwave Theory and Techniques Society, USA, Oct. 1, 2004.
NTT Docomo et al., "Prioritized Deployment Scenarios for LTE-Advanced Studies", 3GPP TSG RAN WG4 Meeting # 50, Athens, Greece, Feb. 9-13, 2009 (R4-091011).
Hanzo et al., "OFDM and MCCDMA for Broadband Multi-User Communications, WLANs and Broadcasting", Wiley-IEEE Press, chapter 14, pp. 485-548, Sep. 19, 2003.
China Mobile et al., "Framework for LTE PDSCH DRS Demodulation Requirements", 3GPP TSG RAN WG4 Meeting #49, Prague, Czech Republic, Nov. 10-14, 2008.
Qualcomm Europe, "Downlink RS Structure in Support of Higher-Order MIMO", 3GPP TSG RAN WG1 Meeting #57, San Francisco, USA, May 4-8, 2009.
"RAN1 Chairman Notes", 3GPP TSG RAN WG1 Meeting #55bis, Ljubljana, Slovenia, Jan. 12-16, 2009.
Marvell Semiconductor, "Number of Codewords for 8×8 SU-MIMO in LTE-A DL", 3GPP TSG RAN WG1 Meeting #55bis, Ljubljana, Slovenia, Jan. 12-16, 2009.
LG Electronics, "Consideration of DL-MIMO in LTE-Advanced", 3GPP TSG RAN WG1 Meeting #55, Prague, Czech Republic, Nov. 10-14, 2008.

(56) References Cited

OTHER PUBLICATIONS

3rd Generation Partnership Project; Technical Specification Group Radio Access Network; Further Advancements for E-UTRA Physical Layer Aspects (Release 9), 3GPP TS 36.814 V0.4.1 (Feb. 2009), Sophia Antipolis, France.

ETSI TS 136213, "LTE; Evolved Universal Terrestrial Radio Access (E-UTRA), Physical Layer Procedures", V10.2.0, Jun. 2011.

3rd Generation Partnership Project; Technical Specification Group Radio Access Network; Evolved Universal Terrestrial Radio Access (E-UTRA); Physical Channels and Modulation (Release 8), 3GPP TS 36.211 V8.4.0 (Sep. 2008), Sophia Antipolis, France.

Alcatel-Lucent, "CQI and CSI Feedback Compression", 3GPP TSG RAN WG1 #54bis, Prague, Czech Republic, Sep. 29-Oct. 3, 2008.

Huawei, "DL MIMO Codebook", 3GPP TSG RAN WG1 Meeting #56bis, Seoul, South Korea, Mar. 23-27, 2009.

Huawei, "Adaptive Codebook Designs for MU-MIMO", 3GPP TSG RAM WG1 Meeting #56bis, Seoul, South Korea, Mar. 23-27, 2009.

Motorola, "On UE Feedback to Support LTE-A MU-MIMO and CoMP Operations", TSG-RAN WG1 #56bis, Seoul, South Korea, Mar. 23-27, 2009.

Huawei, "Adaptive Codebook Designs for DL MIMO", 3GPP TSG RAN WG1 Meeting #57, San Francisco, CA USA, May 3-8, 2009.

Ericsson, "On CSI feedback for ITU Requirement Fulfilling CoMP Schemes", TSG-RAN WG1 #57, San Francisco, USA, May 4-8, 2009.

Motorola, "Spatial Correlation Feedback to Support LTE-A MU-MIMO and CoMP: System Operation and Performance Results", TSG-RAN WG1 #57, San Francisco, USA, May 4-8, 2009.

Xia et al., "Design and Analysis of Transmit—Beamforming based on Limited-Rate Feedback", IEEE Transactions on signal processing (Draft), Minneapolis, MN, Mar. 16, 2005.

Huawei, "The Impact of CA on Mobility in LTE-A", 3GPP TSG RAN WG1 Meeting #56, Athens, Greece, Feb. 9-13, 2009.

U.S. Appl. No. 61/111,475, filed Nov. 5, 2008.

Research in Motion, UK Limited, "Uplink Power Control for Carrier Aggregation", 3GPP TSG RAN WG1 Meeting # 57b, Lon Angeles, USA, Jun. 29-Jul. 3, 2009 (R1-092415).

Nokia Siemens Networks, "PUSCH Power Control for LTE-Advanced", 3GPP TSG RAN WG1 Meeting # 57bis, Los Angeles, USA, Jun. 29-Jul. 3, 2009 (R1-092574).

3rd Generation Partnership Project; Technical Specification Group Radio Access Network; Radio Frequency (RF) System Scenarios (Release 5), 3GPP TR 25.942 V5.3.0, Sophia Antipolis, France, Jun. 2004.

Nokia Siemens Networks, "Autonomous Component Carrier Selection for LTE Advanced", 3GPP TSG RAN WG1 Meeting #54, Jeju Island, Korea, Aug. 18-22, 2008 (R1-083103).

Nokia Siemens Networks, "Algorithms and Results for Autonomous Component Carrier Selection for LTE-Advanced", 3GPP TSG RAN WG1 Meeting #55, Prague, Czech Republic, Nov. 10-14, 2008 (R1-084321).

Nokia Siemens Networks, "Use of Background Interference Matrix for Autonomous Component Carrier Selection for LTE-Advanced", 3GPP TSG RAN WG1 Meeting #55-bis, Ljubljana, Slovenia, Jan. 12-16, 2009 (R1-090235).

Qualcomm Europe, Notion of Anchor Carrier in LTE-A, 3GPP TSG RAN WG1 Meeting #55-bis, Ljubljana, Slovenia, Jan. 12-16, 2009 (R1-080356).

Samsung, "UL Transmission Power Control in LTE-A", 3GPP TSG RAN WG1 Meeting #56bis, Seoul, Korea, Mar. 23-27, 2009 (R1-091250).

International Application PCT/IB2010/055763 Search Report dated Jun. 14, 2011.

International Application PCT/IB2011/050015 Search Report dated Jul. 5, 2011.

Marvell, "Downlink MIMO with Coordinated Beamforming and Scheduling", 3GPP TSG RAN WG1 59, Jeju, South Korea, Nov. 9-14, 2009.

Texas Instruments, "Views and Simulation Results on 4Tx Codebook Enhancement", 3GPP TSG RAN WG1 62, Madrid, Spain, Aug. 23-27, 2010.

Texas Instruments, "Higher CSI feedback accuracy for 4/8Tx Rel.10 DL MIMO", 3GPP TSG RAN WG1 62, Madrid, Spain, Aug. 23-27, 2010.

U.S. Appl. No. 12/965,878 Official Action dated Apr. 1, 2013.

U.S. Appl. No. 13/023,555 Office Action dated Feb. 5, 2013.

International Application PCT/IB2012/056181 Search Report dated Mar. 4, 2013.

International Application PCT/IB2012/056289 Search Report dated Mar. 26, 2013.

International Application PCT/IB2012/056182 Search Report dated Feb. 26, 2013.

Japanese Patent Application # 2011024295 Office Action dated Jan. 15, 2013.

U.S. Appl. No. 12/902,168 Office Action dated Aug. 5, 2013.

U.S. Appl. No. 12/983,898 Office Action dated Sep. 12, 2013.

U.S. Appl. No. 13/052,075 Office Action dated Jul. 15, 2013.

U.S. Appl. No. 13/766,790 Office Action dated Jul. 22, 2013.

U.S. Appl. No. 12/903,237 Office Action dated Aug. 16, 2013.

International Application PCT/IB2013/052963 Search Report dated Sep. 27, 2013.

JP Patent Application # 2011-551560 Office Action dated Oct. 29, 2013.

JP Patent Application # 2012-506601 Office Action dated Oct. 22, 2013.

U.S. Appl. No. 12/965,878 Office Action dated Oct. 24, 2013.

U.S. Appl. No. 13/052,075 Notice of Allowance dated Nov. 8, 2013.

U.S. Appl. No. 13/543,835 Office Action dated Nov. 22, 2013.

U.S. Appl. No. 12/965,878 Notice of Allowance dated Feb. 10, 2014.

* cited by examiner

CHANNEL FEEDBACK FOR TDM SCHEDULING IN HETEROGENEOUS NETWORKS HAVING MULTIPLE CELL CLASSES

CROSS-REFERENCE TO RELATED APPLICATIONS

This application claims the benefit of U.S. Provisional Patent Application 61/448,497, filed Mar. 2, 2011, whose disclosure is incorporated herein by reference.

FIELD OF THE DISCLOSURE

The present invention relates generally to communication systems, and particularly to methods and systems for providing channel feedback in wireless communication systems.

BACKGROUND

Some cellular networks comprise multiple layers of cells of different classes, e.g., macro cells, microcells, picocells and/or femtocells. Such networks are sometimes referred to as heterogeneous networks. The multi-layer network structure affects the interference experienced by communication terminals. Several techniques are known in the art for reducing interference in heterogeneous networks.

For example, 3GPP Technical Specification Group Radio Access Network (TSG-RAN) WG1 document R1-103561, entitled "Improving Control Reliability in Severe Interference Conditions," Dresden, Germany, June 28-Jul. 2, 2010, which is incorporated herein by reference, describes Time Division Multiplexing (TDM) scheduling schemes for improving the reliability of downlink control channels using sub-frame partitioning. TDM scheduling schemes of this sort are further analyzed in TSG-RAN WG1 document R1-104817, entitled "Analysis of Solutions to Improve Control Reliability in Severe Interference Conditions," Madrid, Spain, August 23-27, which is incorporated herein by reference. Example TDM scheduling patterns for heterogeneous networks are also proposed in TSG-RAN WG1 document R1-105336, entitled "On Data Channel Performance with Cell Range Expansion and Non-Full Buffer Traffic," which is incorporated herein by reference.

The description above is presented as a general overview of related art in this field and should not be construed as an admission that any of the information it contains constitutes prior art against the present patent application.

SUMMARY

A method includes receiving in a mobile communication terminal a sequence of downlink frames from a communication network that includes multiple cells arranged in at least first and second layers. Each layer corresponds to a respective class of the cells. One or more cross-layer frames, in which at least a first cell in the first layer and at least a second cell in the second layer transmit data, are identified in the sequence. One or more same-layer frames, in which only one or more of the cells in a single layer that currently serves the terminal transmit the data, are identified in the sequence. Cross-layer channel feedback is calculated over the cross-layer frames, and same-layer channel feedback is calculated over the same-layer frames. The cross-layer channel feedback and the same-layer channel feedback are transmitted from the terminal.

In an embodiment, calculating the cross-layer channel feedback and the same-layer channel feedback includes calculating a cross-layer Signal to Interference and Noise Ratio (SINR) over the received cross-layer frames, calculating a same-layer SINR over the received same-layer frames, and calculating the cross-layer channel feedback and the same-layer channel feedback based on the cross-layer SINR and the same-layer SINR, respectively.

In a disclosed embodiment, calculating the cross-layer channel feedback and the same-layer channel feedback includes calculating a cross-layer covariance matrix over the received cross-layer frames, calculating a same-layer covariance matrix over the received same-layer frames, and calculating the cross-layer channel feedback and the same-layer channel feedback based on the cross-layer covariance matrix and the same-layer covariance matrix, respectively.

In another embodiment, transmitting the cross-layer channel feedback and the same-layer channel feedback includes sending both the cross-layer channel feedback and the same-layer channel feedback in a single uplink frame. In an alternative embodiment, transmitting the cross-layer channel feedback and the same-layer channel feedback includes interleaving the cross-layer channel feedback and the same-layer channel feedback in alternate uplink frames.

In yet another embodiment, transmitting the cross-layer channel feedback and the same-layer channel feedback includes transmitting the cross-layer channel feedback at a first update rate, and transmitting the same-layer channel feedback at a second update rate, different from the first update rate. In still another embodiment, transmitting the cross-layer channel feedback and the same-layer channel feedback includes compressing one or both of the cross-layer channel feedback and the same-layer channel feedback prior to transmission.

In an example embodiment, receiving the downlink frames includes receiving downlink sub-frames in accordance with a Long Term Evolution (LTE) specification. In an embodiment, identifying the cross-layer frames and the same-layer frames includes automatically detecting a predefined periodic pattern which the cells transmit using the cross-layer frames and the same-layer frames.

In some embodiments, receiving the sequence includes receiving the downlink frames from no layer other than the first and second layers. In alternative embodiments, receiving the sequence includes receiving the downlink frames from three or more layers in which the cells are arranged. In an embodiment, identifying the cross-layer frames includes identifying two or more different types of the cross-layer frames, corresponding to respective different subsets of the layers whose cells are permitted to transmit during the cross-layer frames, and calculating the cross-layer channel feedback includes computing the cross-layer channel feedback separately for each type of the cross-layer frames.

There is additionally provided, in accordance with an embodiment that is described herein, apparatus including a receiver, a transmitter and control circuitry. The receiver is configured to receive a sequence of downlink frames from a communication network that includes multiple cells arranged in at least first and second layers, each layer corresponding to a respective class of the cells. The control circuitry is configured to identify in the sequence one or more cross-layer frames in which at least a first cell in the first layer and at least a second cell in the second layer transmit data, to identify in the sequence one or more same-layer frames in which only one or more of the cells in a single layer that currently serves the apparatus transmit the data, to calculate cross-layer channel feedback over the cross-layer frames, and to calculate same-layer channel feedback over the same-layer frames.

The transmitter is configured to transmit the cross-layer channel feedback and the same-layer channel feedback to the communication network.

In some embodiments, a mobile communication terminal includes the disclosed apparatus. In some embodiments, a chipset for processing signals in a mobile communication terminal includes the disclosed apparatus.

The present disclosure will be more fully understood from the following detailed description of the embodiments thereof, taken together with the drawings in which:

DETAILED DESCRIPTION OF EMBODIMENTS

Figure 1:
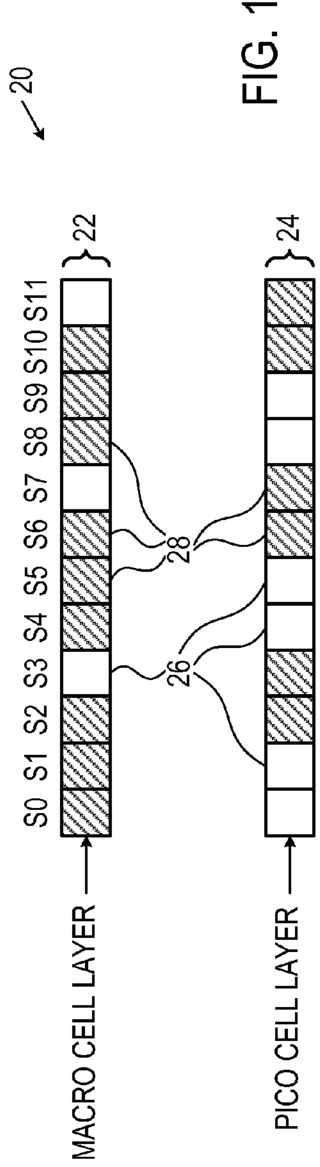
FIG. 1 is a diagram that schematically illustrates a Time Division Multiplexing (TDM) scheduling pattern used in a heterogeneous wireless communication network, in accordance with an embodiment that is described herein.

A heterogeneous cellular network typically comprises multiple cells of different classes, e.g., macro-cells, micro-cells, pico-cells and/or femto-cells, which are deployed in a certain geographical area. Each class of cells, typically defined by a range of transmit power levels, is referred to as a layer.

A mobile communication terminal operating in a heterogeneous network may encounter severe interference, which is caused or intensified by the layered structure of the network. For example, a femto-cell that serves a Closed Subscription Group (CSG) may cause severe interference to a nearby terminal that does not belong to the CSG and is thus served by a distant macro-cell. As another example, a macro-cell may cause severe interference to a terminal served by a nearby pico-cell.

Some heterogeneous networks reduce the interference to mobile communication terminals by applying Time Division Multiplexing (TDM) scheduling among the downlink transmissions of different layers. TDM scheduling is under consideration, for example, for use in enhanced Inter-Cell Interference Cancellation (eICIC) in Release 10 Long Term Evolution (LTE) networks. In a typical TDM scheduling scheme, at least one of the layers of cells transmits an alternating pattern of sub-frames containing data and Almost Blank Sub-frames (ABSs) that do not contain data. Transmission of ABSs in a given layer enables terminals served by another layer to receive downlink signals with reduced interference. (The term "sub-frames" is used in the present description and in the claims to denote time intervals, in accordance with accepted usage in LTE standards.)

Embodiments that are described herein provide improved methods and systems for communication in heterogeneous networks that use TDM scheduling. In some embodiments, a mobile communication terminal uses the received downlink signals to calculate and transmit feedback regarding the downlink communication channel. This feedback is used by the cells in the vicinity of the terminal to configure subsequent transmissions, e.g., in precoding and/or scheduling subsequent transmissions to the terminal.

When the network uses TDM scheduling, however, the terminal may encounter considerably different interference conditions in different sub-frames. In some sub-frames, only cells in the same layer that serves the terminal (i.e., the layer to which the cell that is currently serving the terminal belongs, for example a macro-cell layer or a pico-cell layer) are permitted to transmit data (and cells in other layers transmit ABSs). These sub-frames are referred to herein as same-layer sub-frames. In other sub-frames, cells both in the same layer that serves the terminal as well as cells in other layers are permitted to transmit data. These sub-frames are referred to herein as cross-layer sub-frames.

Typically, the interference to the terminal during the cross-layer sub-frames is significantly stronger than during the same-layer sub-frames, since during the cross-layer sub-frames the terminal may receive signals from cells belonging to multiple layers. In other words, the channel conditions differ considerably between the same-layer sub-frames and the cross-layer sub-frames.

It is possible in principle for the terminal to calculate the feedback indiscriminately over the same-layer and cross-layer sub-frames. This type of feedback, however, is likely to be inaccurate—Overly pessimistic for the same-layer sub-frames (because it may reflect average interference that is worse than the actual interference occurring in the same-layer sub-frames) and overly optimistic for the cross-layer sub-frames (because it may reflect average interference that is lower than the actual interference occurring in the cross-layer sub-frames). Such a feedback may lead to erroneous or sub-optimal operation of the cells, and thus degraded network performance.

Thus, in some disclosed embodiments the terminal calculates two types of channel feedback: A same-layer channel feedback calculated over the same-layer sub-frames, and a cross-layer channel feedback calculated over the cross-layer sub-frames. The terminal distinguishes between the same-layer sub-frames and the cross-layer sub-frames, and calculates the feedback separately for each sub-frame type. Each feedback type may comprise, for example, a Rank Indicator (RI), a Precoding Matrix Indicator (PMI) and/or a Channel Quality Indicator (CQI) for each sub-frame type. In various embodiments, any of these feedback types may be calculated separately for the same-layer sub-frames and the cross-layer sub-frames. Example methods for calculating the feedback are described herein.

The terminal transmits the same-layer feedback and the cross-layer feedback over the uplink channel, e.g., in the same uplink sub-frame or in alternate uplink sub-frames. In some embodiments, the terminal compresses one or both feedback types prior to transmission, in order to reduce uplink overhead.

Since the disclosed techniques calculate the channel feedback separately for the same-layer sub-frames and the cross-layer sub-frames, the resulting feedback is highly accurate and matches the actual channel conditions on each sub-frame type. When using this feedback, the cells are able to configure downlink transmissions reliably and accurately, and network performance is therefore improved.

The embodiments described herein refer mainly to same-layer and cross-layer sub-frames in an LTE network. The disclosed techniques, however, are similarly applicable to any other communication network that applies TDM scheduling using same-layer and cross-layer frames. The terms "frames" and "sub-frames" are therefore used interchangeably herein.

FIG. 1 is a diagram that schematically illustrates a TDM scheduling pattern 20 used in a heterogeneous wireless communication network, in accordance with an embodiment that is described herein. In the present example, the network comprises an LTE network having two layers—A layer of macro-cells and a layer of pico-cells. Pattern 20 comprises a period of twelve time-domain LTE downlink sub-frames denoted S0 . . . S11, which is repeated cyclically in the time domain. The macro cells transmit downlink sub-frames in accordance with a pattern 22 shown at the top of the figure, and the pico-cells transmit downlink sub-frames in accordance with a pattern 24 shown at the bottom of the figure, in an embodiment. The macro-cells and the pico-cells are assumed to be time-synchronized, i.e., the boundaries between sub-frames occur simultaneously across the network.

Pattern 20 comprises data-carrying sub-frames 28 (shaded in the figure) that carry data transmissions to terminals, and Almost Blank Sub-frames (ABSs) 26 that do not contain data transmissions (but may contain other signals such as synchronization and reference signals). In the example of FIG. 1, during sub-frames S0, S1, S4, S5, S8 and S9, the macro-cells are permitted to transmit data to the terminals, while the pico-cells are not permitted to transmit data and may only transmit ABSs. During sub-frames S3, S7 and S11, the pico-cells are permitted to transmit data, whereas the macro-cells may only transmit ABSs. During sub-frames S2, S6 and S10, both macro-cells and pico-cells are permitted to transmit data.

From the perspective of a terminal served by one of the macro-cells, sub-frames S0, S1, S4, S5, S8 and S9 are same-layer sub-frames, i.e., sub-frames in which only cells in the layer that serves the terminal are permitted to transmit data. Sub-frames S2, S6 and S10 are cross-layer frames, i.e., sub-frames in which cells in both the layer that serves the terminal and in one or more other layers are permitted to transmit data. From the perspective of a terminal served by one of the pico-cells, sub-frames S3, S7 and S11 are same-layer sub-frames, and sub-frames S2, S6 and S10 are cross-layer sub-frames.

The TDM scheduling pattern of FIG. 1 is shown solely by way of example. In alternative embodiments, any other suitable pattern can be used. The pattern may involve any desired number of layers, with each layer using any desired pattern of data-carrying sub-frames 28 and ABSs 26. In some embodiments, a given layer comprises only data-carrying sub-frames and no ABSs. When the TDM scheduling pattern involves more than two layers, the pattern typically comprises multiple types of cross-layer sub-frames that correspond to multiple combinations of layers that transmit simultaneously.

Figure 2:
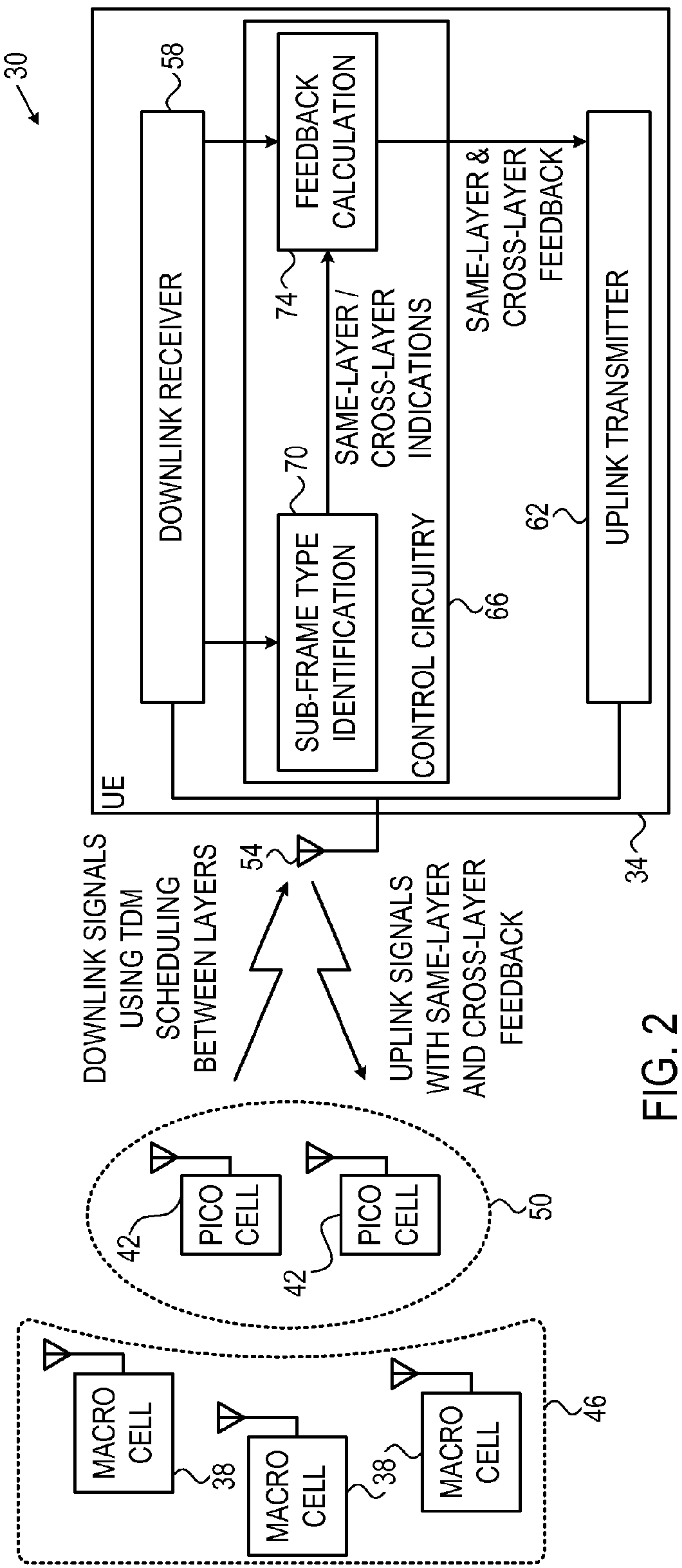
FIG. 2 is a block diagram that schematically illustrates mobile communications user equipment operating on a heterogeneous wireless communication network, in accordance with an embodiment that is described herein.

FIG. 2 is a block diagram that schematically illustrates mobile communications user equipment operating on a heterogeneous wireless communication network 30, in accordance with an embodiment that is described herein. In the present example, system 30 comprises a cellular system that operates in accordance with the Long Term Evolution (LTE) specifications. In alternative embodiments, network 30 may operate in accordance with any other suitable communication standard or protocol that supports TDM scheduling.

In the example of FIG. 2, network 30 comprises a mobile communication terminal 34 (referred to in LTE terminology as User Equipment—UE), three macro-cells 38 and two pico-cells 42. This choice is made, however, purely by way of illustrative example. In real-life configurations, system 30 typically comprises a large number of cells of various types and a large number of terminals. Terminal 34 may comprise, for example, a cellular phone, a wireless-enabled computing device or any other suitable type of communication terminal.

Network 30 is a heterogeneous network, in which the cells are arranged in layers, such that each layer comprises the cells of a certain transmit power class. In the present example, macro cells 38 belong to a layer 46, and pico-cells 42 belong to a layer 50. In alternative embodiments, a layer may comprise any other suitable class of cells, e.g., pico-cells or femto-cells. In another example embodiment, one layer comprises high-power macro cells, and the other layer comprises a given type of Low-Power Nodes (LPNs) such as Remote Radio Heads (RRHs), relay nodes, pico-cells and/or femto-cells). Different types of LPNs typically have different transmit power levels, and a given layer is typically made-up of a single type of LPNs. For example, pico-cells and femto-cells are typically not included in the same layer.

At a given time, terminal 34 is served by one of the cells in network 30, either by a macro-cell in layer 38 or by a pico-cell in layer 50. This cell is referred to as the serving cell of the terminal. In order to reduce interference, network 30 applies TDM scheduling between layers 46 and 50, for example the scheduling pattern of FIG. 1 above. In some embodiments, network 30 comprises one or more controller devices (not seen in the figure) that control communication between the cells and provide various other network services such as scheduling services.

In the present embodiment, terminal 34 comprises at least one antenna 54 for receiving Radio Frequency (RF) downlink signals from the cells and for transmitting RF uplink signals to the cells. A downlink receiver 58 receives the downlink signals via antenna 54, down-converts the signals and extracts downlink data from the signals. An uplink transmitter 62 produces uplink signals, up-converts them to RF and transmits the RF uplink signals via antenna 54.

Control circuitry 66 manages the operation of terminal 34. Among other tasks, the control circuitry calculates channel feedback based on the received downlink signals. The channel feedback is indicative of conditions on the downlink communication channel between the serving cell and terminal 34. The control circuitry provides the channel feedback to uplink transmitter 62 for uplink transmission to the serving cell.

In some embodiments, control circuitry 66 calculates the channel feedback separately for the same-layer sub-frames and for the cross-layer sub-frames, and transmitter 62 transmits the two types of channel feedback to the serving cell. In the example of FIG. 2, control circuitry 66 comprises a sub-frame type identification unit 70 and a feedback calculation unit 74. Unit 70 identifies which of the received downlink sub-frames comprise same-layer sub-frames and which comprise cross-layer sub-frames. Unit 74 calculates same-layer channel feedback that is indicative of the channel conditions during the same-layer sub-frames, and cross-layer channel feedback that is indicative of the channel conditions during the cross-layer sub-frames.

(As noted above, when network 30 comprises more than two layers, the TDM scheduling pattern typically comprises multiple types of cross-layer sub-frames. In these embodiments, unit 70 distinguishes between the multiple types of cross-layer sub-frames, and unit 74 calculates separate channel feedback for each cross-layer sub-frame type.

Unit 74 provides the same-layer channel feedback and the cross-layer channel feedback to uplink transmitter 62 for uplink transmission to the serving cell. The cells of network 30 use the channel feedback received from terminal 34 for configuring subsequent downlink transmissions, e.g., in scheduling or precoding subsequent downlink transmissions to terminal 34.

The terminal and network configurations shown in FIG. 2 are example configurations, which are depicted in a highly simplified manner solely for the sake of clarity. In alternative embodiments, any other suitable terminal and network configurations can be used. Terminal and network elements that are not mandatory for understanding of the disclosed techniques have been omitted from the figure for the sake of clarity.

In various embodiments, some or all of the elements of terminal 34, including receiver 58, transmitter 62 and control circuitry 66, are implemented in hardware, such as implementing elements of the transmitter and receiver using one or more Radio Frequency Integrated Circuits (RFICs), or implementing the elements of the transmitter, the receiver and/or the control circuitry using one or more Field-Programmable Gate Arrays (FPGAs) or Application-Specific Integrated Circuits (ASICs). In alternative embodiments, certain elements of terminal 34 are implemented in software, or using a combination of hardware and software elements.

In some embodiments, certain terminal elements, such as certain elements of control circuitry 66, are implemented in a programmable processor, which is programmed in software to carry out the functions described herein. The software may be downloaded to the processor, in whole or in part, in electronic form, over a network, for example, or it may, alternatively or additionally, be provided and/or stored on non-transitory tangible media, such as magnetic, optical, or electronic memory.

In some embodiments, sub-frame type identification unit 70 identifies the same-layer sub-frames and the cross-layer sub-frames automatically from the received downlink signals, regardless of prior information as to the TDM scheduling pattern. In other embodiments, unit 70 is notified (e.g., by the serving cell) of the TDM scheduling pattern and of the locations of the same-layer sub-frames and the cross-layer sub-frames within the pattern.

In various embodiments, feedback calculation unit 74 calculates the same-layer feedback and the cross-layer feedback in different ways. The description that follows refers to a network comprising two layers—A macro-cell layer and a Low-Power Node (LPN) layer. (As noted above, in alternative embodiments feedback calculation unit 74 calculates multiple types of cross-layer feedback for multiple different types of cross-layer sub-frames.)

In an embodiment, let P denote the number of sub-frames in the TDM scheduling pattern, let Ps_macro denote the number of same-layer sub-frames in the pattern in which macro-cells are scheduled for transmission, and let Ps_lpn denote the number of same-layer sub-frames in the pattern in which LPNs are scheduled for transmission. The number of cross-layer sub-frames in the pattern in which both macro-cells and LPNs are scheduled for transmission is thus Pc=P−(Ps_macro+Ps_lpn).

In some embodiments, unit 74 calculates the same-layer feedback and the cross-layer feedback by estimating two types of channel covariance matrices Rnn—A same-layer covariance matrix Rnn_sl estimated over the same-layer sub-frames and a cross-layer covariance matrix Rnn_cl estimated over the cross-layer sub-frames. From these two matrices, unit 74 estimates a same-layer Signal to Interference and Noise Ratio (SINR) denoted $SINR_{sl}$ over the same-layer sub-frames, and a cross-layer SINR denoted $SINR_{cl}$ over the cross-layer sub-frames.

In an embodiment, the interference in a frequency bin $f_n$ during sub-frame $s_i$ can be written as:

Equation 1:

$$Y(f_n, s_i) = \sum_l H_l(f_n, s_i)x_l(f_n, s_i) + v \quad \text{Equation 1}$$

wherein $H_l$ denotes the channel response between the $l^{th}$ cell and terminal 34, $x_l$ denotes the signal transmitted by the $l^{th}$ cell, v denotes an Additive White Gaussian Noise (AWGN) component whose distribution is CN(0,K), and l is summed over either the same-layer cells or cross-layer cells excluding the serving cell.

Thus, the channel covariance matrix for sub-frame $s_i$, averaged over all frequency bins, can be written as:

$$Rnn(s_i) = \sum_l \left[ \sum_{n=1}^{N} \frac{H_l(f_n, s_i)x_l(f_n, s_i)H_l^H(f_n, s_i)x_l^H(f_n, s_i)}{N} + KI_{Rx} \right] \quad \text{Equation 2}$$

wherein $I_{Rx}$ denotes an identity matrix of size Rx.

For example, in the pattern of FIG. 1 above, if terminal 34 is served by a macro-cell, unit 74 measures Rnn_sl over the interference from all macro-cells other than the serving cell in sub-frames $s_i$=S0, S1, S4, S5, S8, S9, . . . (i=M·P and i=1+M·P, wherein M is integer). If terminal 34 is served by a pico-cell, unit 74 measures Rnn_sl over the interference from all pico-cells other than the serving cell in sub-frames $s_i$=S3, S7, S11, . . . (i=3+M·P). In either case, unit 74 measures Rnn_cl over the interference of all cells other than the serving cell in sub-frames $s_i$=S2, S6, S10 . . . (i=2+M·P). Unit 74 averages each of Rnn_sl and Rnn_cl over their relevant sub-frames during a certain interference averaging period, for example over Q·P sub-frames with Q a positive integer:

$$Rnn_{cl} = \sum_{i=2+MP} Rnn(S_i) \quad \text{Equation 3}$$

$$\text{Rnn\_sl, macro} = \sum_{i=MP,1+MP} Rnn(S_i)$$

$$Rnn_{sl}, lpn = \sum_{i=3+MP} Rnn(S_i)$$

In this embodiment, unit 74 calculates the cross-layer SINR and the same-layer SINR depending on the receiver type (e.g., Minimum Mean Square Error—MMSE or Maximum Ratio Combining—MRC) for all possible combinations of precoding vector $C_n$ and Modulation and Coding Scheme (MCS):

$$SINR_{cl}(c_n, f_1) = f_{RxType}(H(f_1), c_n, \text{Rnn\_cl}) \quad \text{Equation 4}$$

$$SINR_{sl}(c_n, f_1) = f_{RxType}(H(f_1), c_n, \text{Rnn\_sl})$$

$$SINR_{cl}(c_n, CQI = q) = ESM_q(SINR_{cl}(c_n, f_1), SINR_{cl}(c_n, f_2), \ldots, SINR_{cl}(c_n, f_N)) \quad \text{Equation 5}$$

$$SINR_{sl}(c_n, CQI = q) = ESM_q(SINR_{sl}(c_n, f_1), SINR_{sl}(c_n, f_2), \ldots, SINR_{sl}(c_n, f_N))$$

In alternative embodiments, unit 74 may calculate the same-layer and cross-layer covariance matrices and/or the same-layer and cross-layer SINR using any other suitable method.

In some embodiments, unit 74 calculates the cross-layer channel feedback and the same-layer channel feedback based on SINR_cl and SINR_sl. In various embodiments, each type of feedback comprises, for example, a preferred rank (Rank Indicator—RI), a Precoding Matrix Indicator (PMI), a Channel Quality Indicator (CQI) or any other suitable type of feedback that is indicative of the respective communication channel.

In various embodiments, uplink transmitter 62 transmits the same-layer feedback and the cross-layer feedback over the uplink in various ways. In some embodiments, transmitter 62 transmits each type of feedback once every TDM scheduling period P. In this embodiment, during a given TDM scheduling period, the cross-layer feedback is used for configuring downlink transmissions (e.g., scheduling) to terminals during the Pc cross-layer sub-frames, and the same-layer feedback is used for configuring downlink transmissions to terminals served by macro-cells during the Ps_macro same-layer sub-frames and/or to terminals served by LPNs during the Ps_lpn same-layer sub-frames.

In some embodiments, terminal 34 is configured to transmit both the same-layer feedback and the cross-layer feedback in the same uplink sub-frame. In other embodiments the terminal is configured to interleave and transmit the same-layer feedback and the cross-layer feedback in alternate uplink sub-frames. The choice of configuration may depend, for example, on the capacity of the uplink channel used for transmitting the channel feedback (e.g., Physical Uplink Control Channel—PUCCH in LTE). In these embodiments, the same-layer feedback and the cross-layer feedback are transmitted at the same frequency or update rate.

In an example embodiment that uses the TDM scheduling pattern of FIG. 1, for example, a terminal served by a macro-cell transmits both same-layer feedback and cross-layer feedback in sub-frame S7. In another example embodiment, a terminal served by a macro-cell transmits the same-layer feedback during sub-frame S6, and transmits the cross-layer feedback during sub-frame S7.

In another embodiment, a terminal served by a LPN transmits the cross-layer feedback in sub-frame S7, and transmits the same-layer feedback in sub-frame S8. In yet another embodiment, a terminal transmits each type of feedback in alternate TDM scheduling periods (e.g., same-layer feedback in odd-order periods and cross-layer feedback in even-order periods, or vice versa). In alternative embodiments, the terminal transmits the same-layer feedback and the cross-layer feedback in any other suitable sub-frame or sub-frames. In an alternative embodiment, a terminal transmits the same-layer feedback and the cross-layer feedback at different update rates or frequencies, i.e., at different periodic intervals. In an example embodiment, terminals served by macro-cells transmit the same-layer feedback at four sub-frame intervals, e.g., in sub-frames S2, S6, . . . , and transmit the cross-layer feedback at eight sub-frame intervals, e.g., in sub-frames S7, S15, . . . . Further alternatively, terminal 34 may transmit the same-layer and the cross-layer feedback in accordance with any other suitable pattern or intervals of sub-frames.

In some embodiments, control circuitry 66 compresses one or both of the same-layer feedback and the cross-layer feedback prior to uplink transmission, and provides the compressed feedback to uplink transmitter 62 for uplink transmission. In the example embodiments below, circuitry 66 transmits a RI, a PMI and a CQI as the same-layer feedback, and a RI, a PMI and a CQI as the cross-layer feedback, but sets one or more of these parameters to be the same for both types of feedback.

In an example embodiment, control circuitry 66 sets the RI (preferred rank) of the same-layer feedback to be the same as the RI of the cross-layer feedback. In this embodiment the RI is transmitted only once and applies to both feedback types. In another example embodiment, control circuitry 66 sets the RI to be the same for the same-layer and the cross-layer feedback, and also sets the PMI to be the same for both feedback types. In other words, only a single RI and a single PMI are transmitted, and they apply to both types of feedback.

In yet another embodiment, control circuitry 66 transmits the CQI of one feedback type differentially relative to the CQI of the other feedback type. In other words, the control circuitry transmits the CQI of one of the same-layer and the cross-layer feedback, and the difference between this CQI and the CQI of the other feedback type. Further alternatively, control circuitry 66 may use any other suitable scheme for compressing one or both of the same-layer and cross-layer feedback.

Figure 3:
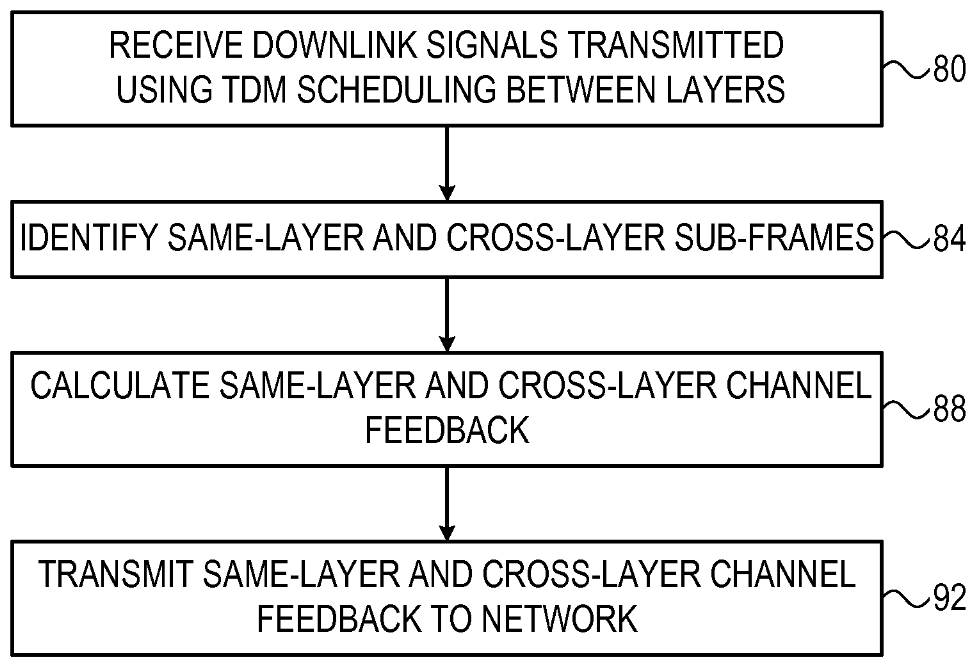
FIG. 3 is a flow chart that schematically illustrates a method for providing channel feedback in a heterogeneous wireless communication network, in accordance with an embodiment that is described herein.

FIG. 3 is a flow chart that schematically illustrates a method for providing channel feedback in the heterogeneous wireless communication network 30, in accordance with an embodiment that is described herein. The method begins with downlink receiver 58 of terminal 34 receiving downlink signals from the cells of network 30, at a downlink reception operation 80. Sub-frame type identification unit 70 in control circuitry 66 of the terminal identifies the same-layer sub-frames and the cross-layer sub-frames, at a sub-frame type identification operation 84.

Unit 74 in control circuitry 66 calculates same-layer channel feedback over one or more of the same-layer sub-frames, and calculates cross-layer channel feedback over one or more of the cross-layer sub-frames, at a feedback calculation operation 88. Uplink transmitter 62 of terminal 34 transmits the respective same-layer channel feedback and cross-layer channel feedback for the respective layers and cross-layer combination over the uplink, at an uplink transmission operation 92.

Although the embodiments described herein mainly address same-layer and cross-layer sub-frames, the methods and systems described herein can also be used with any other suitable classification of frames. In other words, in some embodiments control circuitry 66 classifies received frames into two or more classes, such that the frames in each class have certain interference characteristics that differ from one class to the other. Based on this classification, control circuitry 66 calculates channel feedback separately for each of the classes, and reports this feedback to the cells.

It is noted that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:

receiving in a mobile communication terminal a sequence of downlink frames from a communication network that includes multiple cells arranged in at least first and second layers, wherein the first layer corresponds to a first class of the cells selected from a group of classes consisting of macro-cells, micro-cells, pico-cells, femto-cells and low-power nodes (LPN), and wherein the second layer corresponds to a second class of the cells that is different from the first class;

identifying in the sequence one or more cross-layer frames in which at least a first cell in the first layer and at least a second cell in the second layer transmit data;

identifying in the sequence one or more same-layer frames in which only one or more of the cells in a single layer that currently serves the terminal transmit the data;

calculating cross-layer channel feedback over the cross-layer frames, and calculating same-layer channel feedback over the same-layer frames; and transmitting the cross-layer channel feedback and the same-layer channel feedback from the terminal.

2. The method according to claim 1, wherein calculating the cross-layer channel feedback and the same-layer channel feedback comprises calculating a cross-layer Signal to Interference and Noise Ratio (SINR) over the received cross-layer frames, calculating a same-layer SINR over the received same-layer frames, and calculating the cross-layer channel feedback and the same-layer channel feedback based on the cross-layer SINR and the same-layer SINR, respectively.

3. The method according to claim 1, wherein calculating the cross-layer channel feedback and the same-layer channel feedback comprises calculating a cross-layer covariance matrix over the received cross-layer frames, calculating a same-layer covariance matrix over the received same-layer frames, and calculating the cross-layer channel feedback and the same-layer channel feedback based on the cross-layer covariance matrix and the same-layer covariance matrix, respectively.

4. The method according to claim 1, wherein transmitting the cross-layer channel feedback and the same-layer channel feedback comprises sending both the cross-layer channel feedback and the same-layer channel feedback in a single uplink frame.

5. The method according to claim 1, wherein transmitting the cross-layer channel feedback and the same-layer channel feedback comprises interleaving the cross-layer channel feedback and the same-layer channel feedback in alternate uplink frames.

6. The method according to claim 1, wherein transmitting the cross-layer channel feedback and the same-layer channel feedback comprises transmitting the cross-layer channel feedback at a first update rate, and transmitting the same-layer channel feedback at a second update rate, different from the first update rate.

7. The method according to claim 1, wherein transmitting the cross-layer channel feedback and the same-layer channel feedback comprises compressing one or both of the cross-layer channel feedback and the same-layer channel feedback prior to transmission.

8. The method according to claim 1, wherein receiving the downlink frames comprises receiving downlink sub-frames in accordance with a Long Term Evolution (LTE) specification.

9. The method according to claim 1, wherein identifying the cross-layer frames and the same-layer frames comprises automatically detecting a predefined periodic pattern which the cells transmit using the cross-layer frames and the same-layer frames.

10. The method according to claim 1, wherein receiving the sequence comprises receiving the downlink frames from no layer other than the first and second layers.

11. The method according to claim 1, wherein receiving the sequence comprises receiving the downlink frames from three or more layers in which the cells are arranged.

12. The method according to claim 11, wherein identifying the cross-layer frames comprises identifying two or more different types of the cross-layer frames, corresponding to respective different subsets of the layers whose cells are permitted to transmit during the cross-layer frames, and wherein calculating the cross-layer channel feedback comprises computing the cross-layer channel feedback separately for each type of the cross-layer frames.

13. Apparatus, comprising:

a receiver, which is configured to receive a sequence of downlink frames from a communication network that includes multiple cells arranged in at least first and second layers, wherein the first layer corresponds to a first class of the cells selected from a group of classes consisting of macro-cells, micro-cells, pico-cells, femto-cells and low-power nodes (LPN), and wherein the second layer corresponds to a second class of the cells that is different from the first class;

control circuitry, which is configured to identify in the sequence one or more cross-layer frames in which at least a first cell in the first layer and at least a second cell in the second layer transmit data, to identify in the sequence one or more same-layer frames in which only one or more of the cells in a single layer that currently serves the apparatus transmit the data, to calculate cross-layer channel feedback over the cross-layer frames, and to calculate same-layer channel feedback over the same-layer frames; and a transmitter, which is configured to transmit the cross-layer channel feedback and the same-layer channel feedback to the communication network.

14. The apparatus according to claim 13, wherein the control circuitry is configured to calculate a cross-layer Signal to Interference and Noise Ratio (SINR) over the received cross-layer frames, to calculate a same-layer SINR over the received same-layer frames, and to calculate the cross-layer channel feedback and the same-layer channel feedback based on the cross-layer SINR and the same-layer SINR, respectively.

15. The apparatus according to claim 13, wherein the control circuitry is configured to calculate a cross-layer covariance matrix over the received cross-layer frames, to calculate a same-layer covariance matrix over the received same-layer frames, and to calculate the cross-layer channel feedback and the same-layer channel feedback based on the cross-layer covariance matrix and the same-layer covariance matrix, respectively.

16. The apparatus according to claim 13, wherein the transmitter is configured to transmit both the cross-layer channel feedback and the same-layer channel feedback in a single uplink frame.

17. The apparatus according to claim 13, wherein the transmitter is configured to interleave the cross-layer channel feedback and the same-layer channel feedback in alternate uplink frames.

18. The apparatus according to claim 13, wherein the transmitter is configured to transmit the cross-layer channel feedback at a first update rate, and to transmit the same-layer channel feedback at a second update rate, different from the first update rate.

19. The apparatus according to claim 13, wherein the control circuitry is configured to compress one or both of the cross-layer channel feedback and the same-layer channel feedback prior to transmission.

20. The apparatus according to claim 13, wherein the receiver is configured to receive from the communication network downlink sub-frames in accordance with a Long Term Evolution (LTE) specification.

21. The apparatus according to claim 13, wherein the control circuitry is configured to identify the cross-layer frames and the same-layer frames by automatically detecting a predefined periodic pattern which the cells transmit using the cross-layer frames and the same-layer frames.

22. The apparatus according to claim 13, wherein the receiver is configured to receive the downlink frames from no layer other than the first and second layers.

23. The apparatus according to claim 13, wherein the receiver is configured to receive the downlink frames from three or more layers in which the cells are arranged.

24. The apparatus according to claim 23, wherein the control circuitry is configured to identify two or more different types of the cross-layer frames, corresponding to respective different subsets of the layers whose cells are permitted to transmit during the cross-layer frames, and to calculate the cross-layer channel feedback separately for each type of the cross-layer frames.

25. A mobile communication terminal comprising the apparatus of claim 13.

26. A chipset for processing signals in a mobile communication terminal, comprising the apparatus of claim 13.

* * * * *